United States Patent
Stebnicki et al.

(10) Patent No.: US 7,293,644 B2
(45) Date of Patent: Nov. 13, 2007

(54) SIDE-FLEXING CONVEYOR CHAIN

(75) Inventors: James C. Stebnicki, Glendale, WI (US); Robert E. Mitchell, Milwaukee, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 393 days.

(21) Appl. No.: 11/005,250

(22) Filed: Dec. 6, 2004

(65) Prior Publication Data
US 2006/0118395 A1  Jun. 8, 2006

(51) Int. Cl.
*B65G 17/38* (2006.01)
(52) U.S. Cl. ............... 198/853; 198/850
(58) Field of Classification Search ........ 198/850, 198/851, 852, 853
See application file for complete search history.

(56) References Cited

U.S. PATENT DOCUMENTS

| | | | |
|---|---|---|---|
| 2,010,124 A | 8/1935 | Worrall | |
| 2,655,250 A | 10/1953 | Woolling | |
| 3,513,965 A | 5/1970 | Miller | |
| 3,572,948 A | 3/1971 | Hammitt | |
| 4,153,152 A | 5/1979 | Lapeyre | |
| RE30,035 E | 6/1979 | Miller | |
| 4,222,483 A | 9/1980 | Wootton et al. | |
| 4,290,762 A | 9/1981 | Lapeyre | |
| 5,156,264 A * | 10/1992 | Lapeyre | 198/852 |
| 5,307,923 A * | 5/1994 | Damkjaer | 198/852 |
| 5,678,683 A | 10/1997 | Stebnicki et al. | |
| 5,690,210 A * | 11/1997 | Layne | 198/853 |
| 6,036,001 A | 3/2000 | Stebnicki et al. | |
| 6,142,295 A | 11/2000 | Greve | |
| 6,401,914 B1 | 6/2002 | Greve | |
| 6,615,979 B2 | 9/2003 | Etherington et al. | |
| 6,672,451 B1 * | 1/2004 | Thompson et al. | 198/853 |
| 2003/0136647 A1 | 7/2003 | Knott et al. | |

FOREIGN PATENT DOCUMENTS

DE   100 24 121 A1   11/2001
EP   0 878 418 A1    11/1998

OTHER PUBLICATIONS

European Search Report dated Jan. 26, 2006.

* cited by examiner

*Primary Examiner*—James R. Bidwell
(74) *Attorney, Agent, or Firm*—Quarles & Brady LLP

(57) ABSTRACT

A side-flexing conveyor chain module that distributes chain tension across the width of the belt module includes a first module member and a second module member. The first module member has first link ends extending in a direction of conveyor travel and arcuate first fingers extending in a direction substantially opposite to the direction of conveyor travel. A second module member is pivotally coupled to the first module member about a module vertical axis. The second module member has second link ends extending in a direction substantially opposite to the direction of conveyor travel and arcuate second fingers extending substantially in the direction of conveyor travel which interdigitate with the first fingers. Cam surfaces on the first fingers engage cam surfaces on the second fingers to transfer forces between the first and second module members.

20 Claims, 15 Drawing Sheets

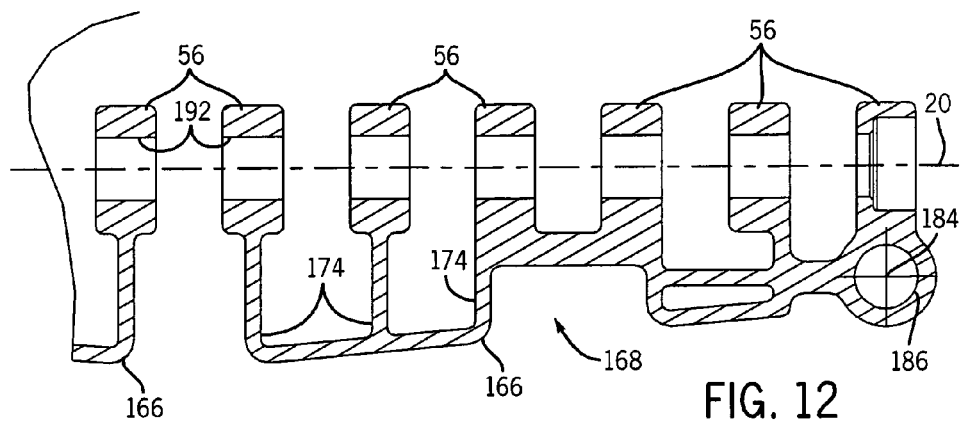
FIG. 12
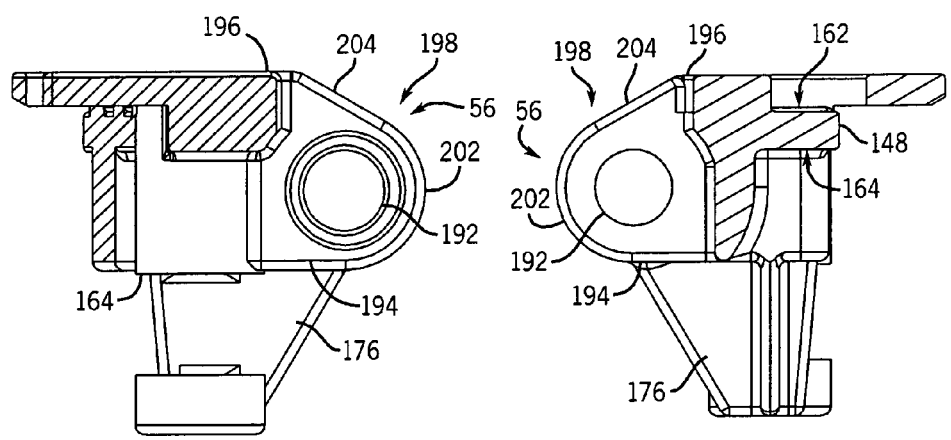
FIG. 13
FIG. 15
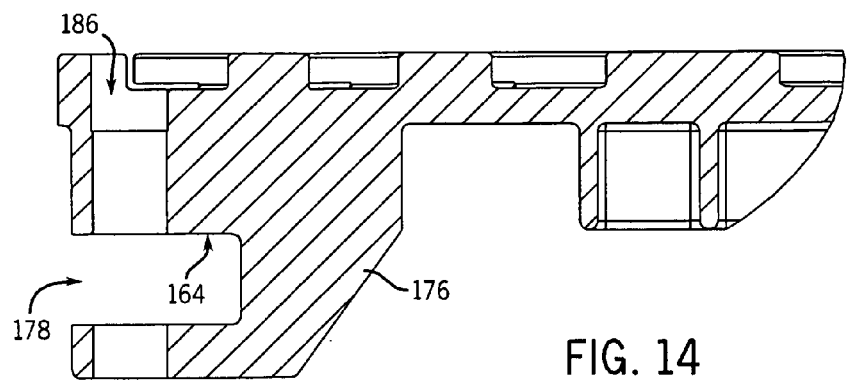
FIG. 14

SIDE-FLEXING CONVEYOR CHAIN

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The field of invention is modular conveyor chains and belts, and more particularly, side-flexing modular conveyor chains and belts.

Side-flexing modular conveyor chains and belts are typically formed from a plurality of chain links pivotally linked about a horizontal axis by a hinge pin. Each link has a leading edge side including a plurality of eyes that are interdigitated with a plurality of eyes formed in a trailing edge side of an adjacent link. In most known side-flexing chains and belts, coaxial slotted holes formed in the eyes receive the hinge pin to pivotally link the adjacent links together about a horizontal axis.

The eyes are slotted to allow the chain or belt to side-flex, or travel along a curve. When side-flexing, the portion of the links on the inside of the curve collapse, or are forced closer to together, while the portion of the links on the outside of the curve expand, or are pulled apart, to allow the chain or belt to travel along the curve. As a result all of the tension when side-flexing is carried in the outer most eye of the links and the outermost eye and shear point on the hinge pin carries the entire load of the chain tension which can cause premature failure. Therefore, a need exists for a side-flexing conveyor chain module that distributes chain tension across the width of the belt module

BRIEF SUMMARY OF THE INVENTION

The present invention provides a side-flexing conveyor chain module that distributes chain tension across the width of the belt module. The module includes a first module member having first link ends extending in a direction of conveyor travel and arcuate first fingers extending in a direction substantially opposite to the direction of conveyor travel. A second module member is pivotally coupled to the first module member about a module vertical axis. The second module member has second link ends extending in a direction substantially opposite to the direction of conveyor travel and arcuate second fingers extending substantially in the direction of conveyor travel which interdigitate with the first fingers. Cam surfaces on the first fingers engage cam surfaces on the second fingers to transfer forces between the first and second module members.

A general objective of the present invention is to transfer forces between first and second module members across the width of the chain module. This objective is accomplished by providing fingers extending from each of the module members that have cam surfaces for transferring forces between the module members.

The foregoing and other objectives and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 12 is a sectional view along line 12-12 of FIG. 11;
FIG. 13 is a sectional view along line 13-13 of FIG. 11;
FIG. 14 is a sectional view along line 14-14 of FIG. 10;
FIG. 15 is a sectional view along line 15-15 of FIG. 11.

DETAILED DESCRIPTION OF THE PREFERRED EMBODIMENTS

Figure 1:
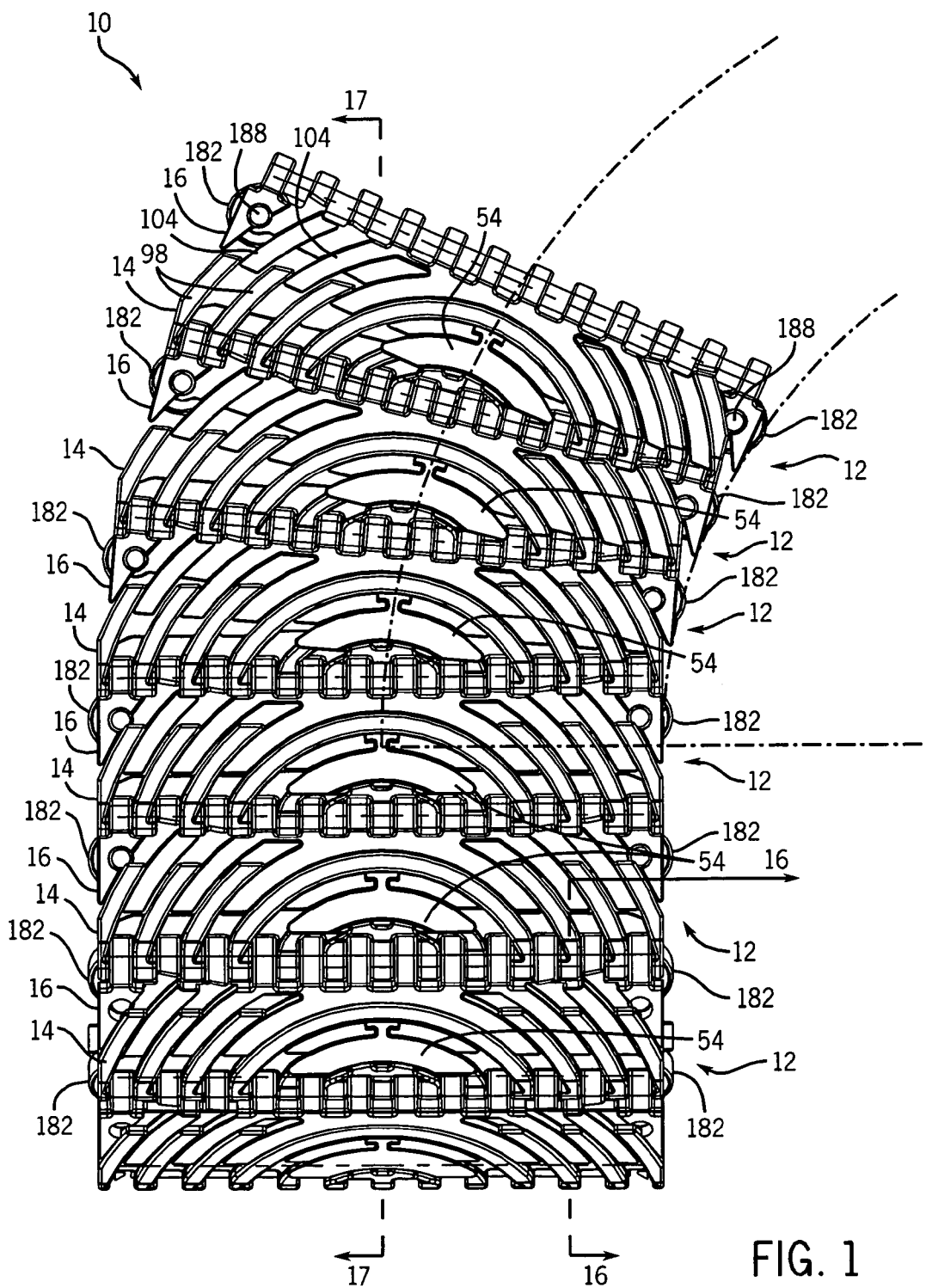
FIG. 1 is a top view of a side-flexing conveyor chain incorporating the present invention.
Figure 2:
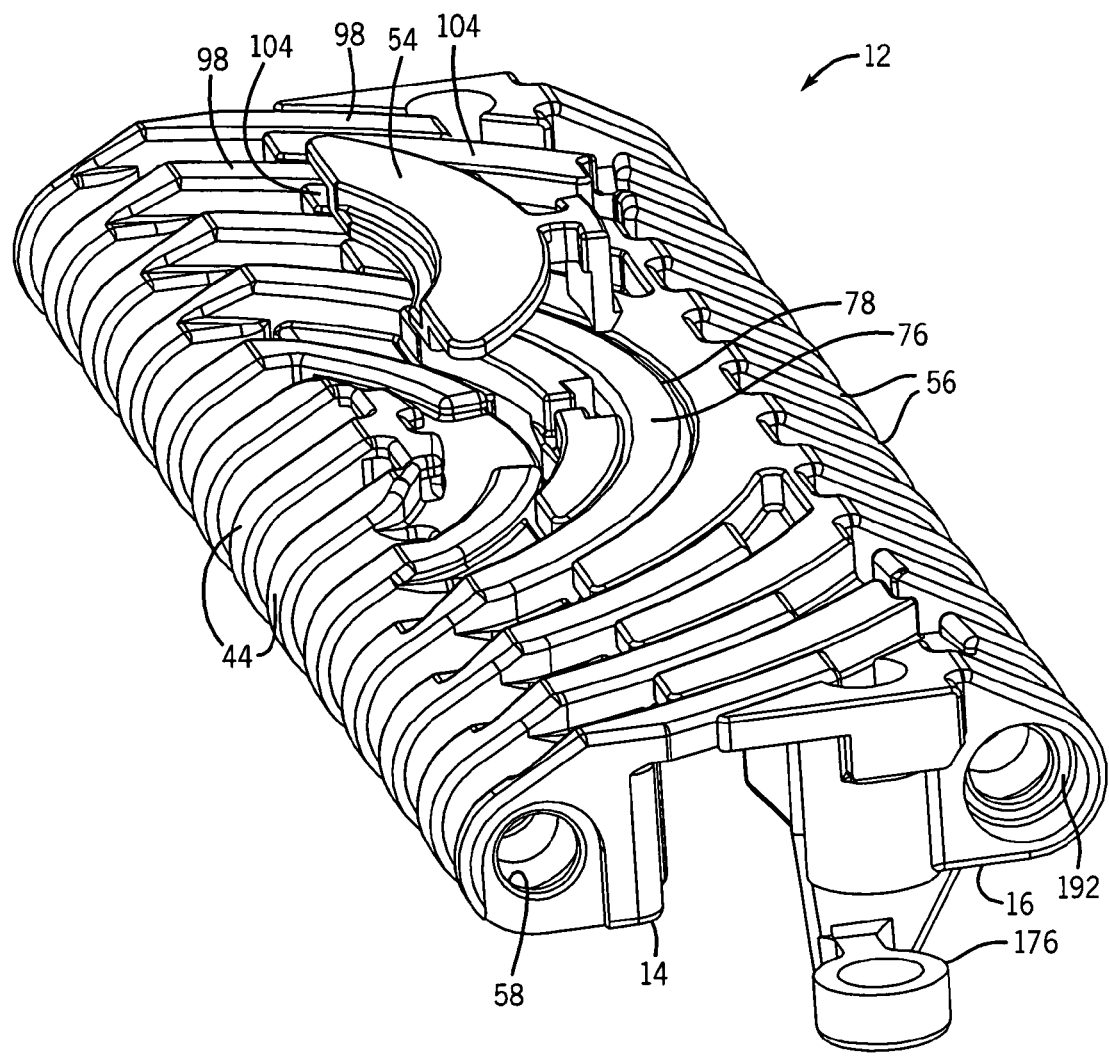
FIG. 2 is a top perspective exploded view of a module of the side flexing conveyor chain of FIG. 1.
Figure 3:
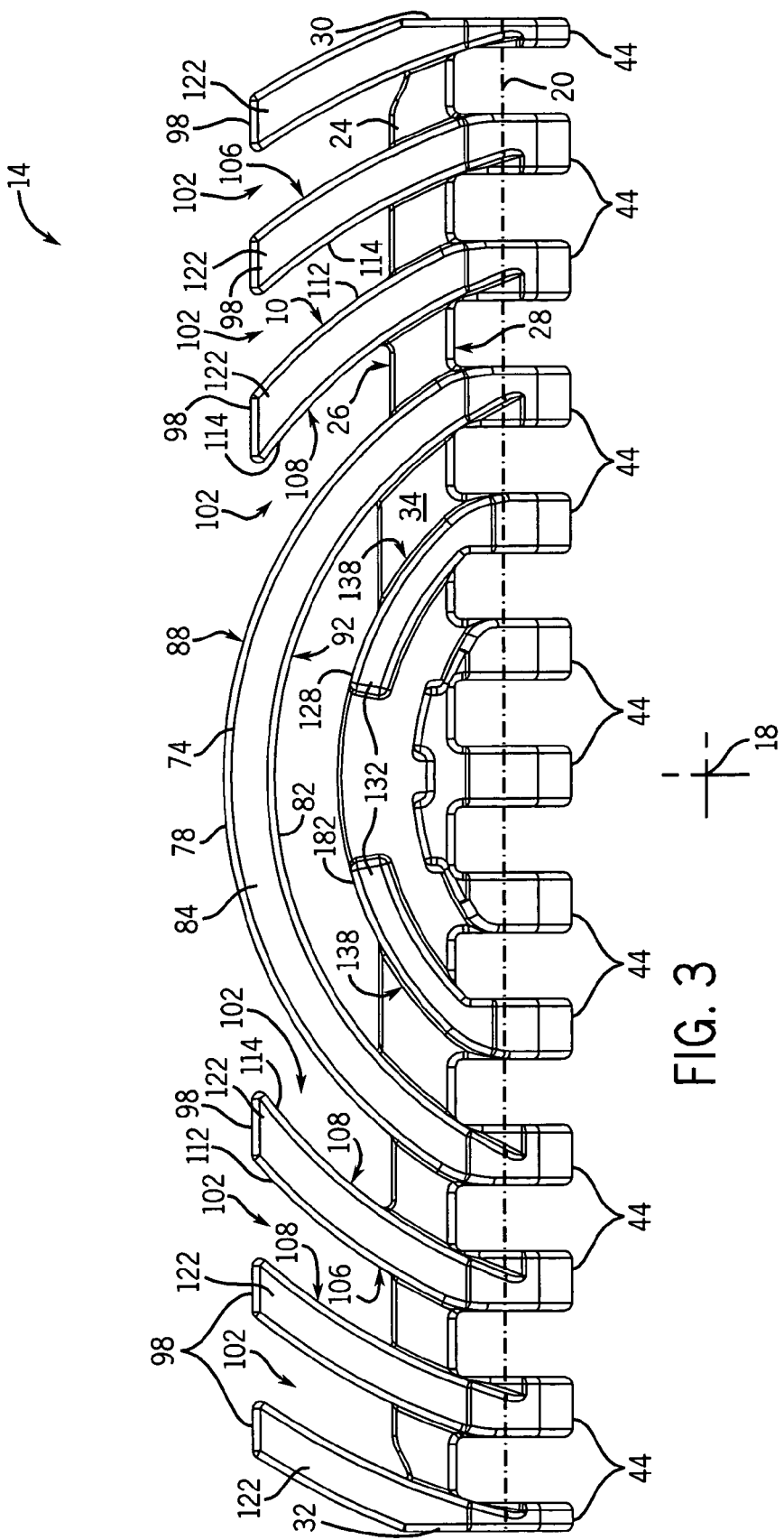
FIG. 3 is a top view of a first module member of the module of FIG. 2.
Figure 4:
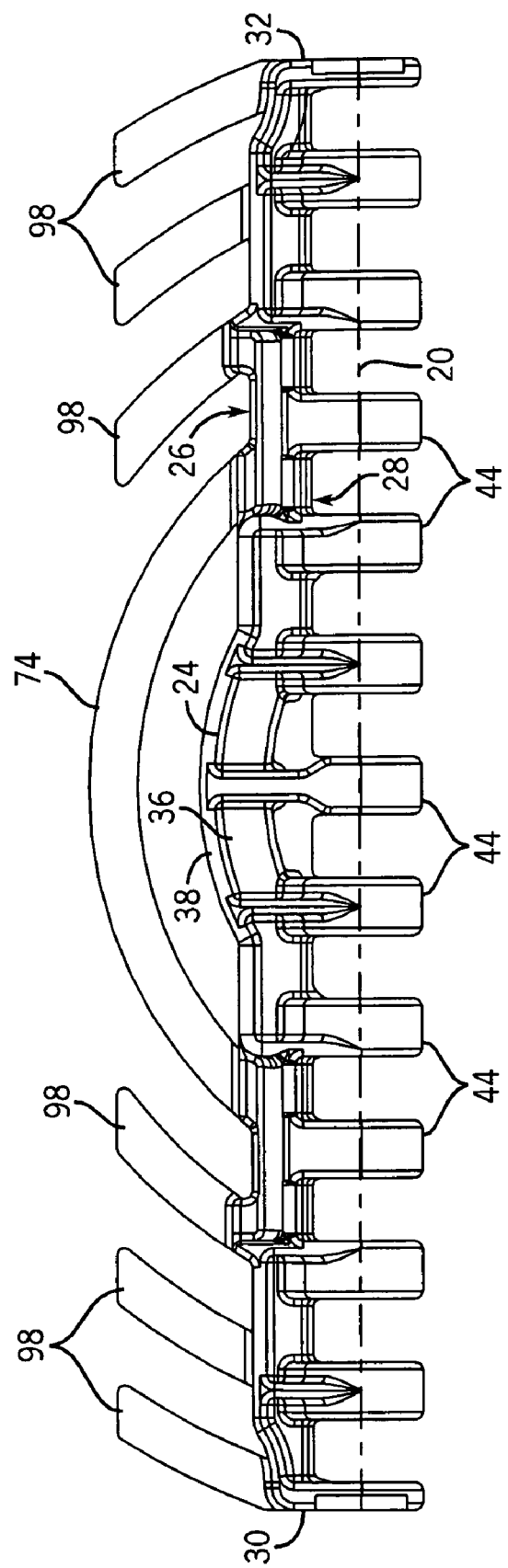
FIG. 4 is a bottom view of the first module member of the module of FIG. 2.
Figure 5:
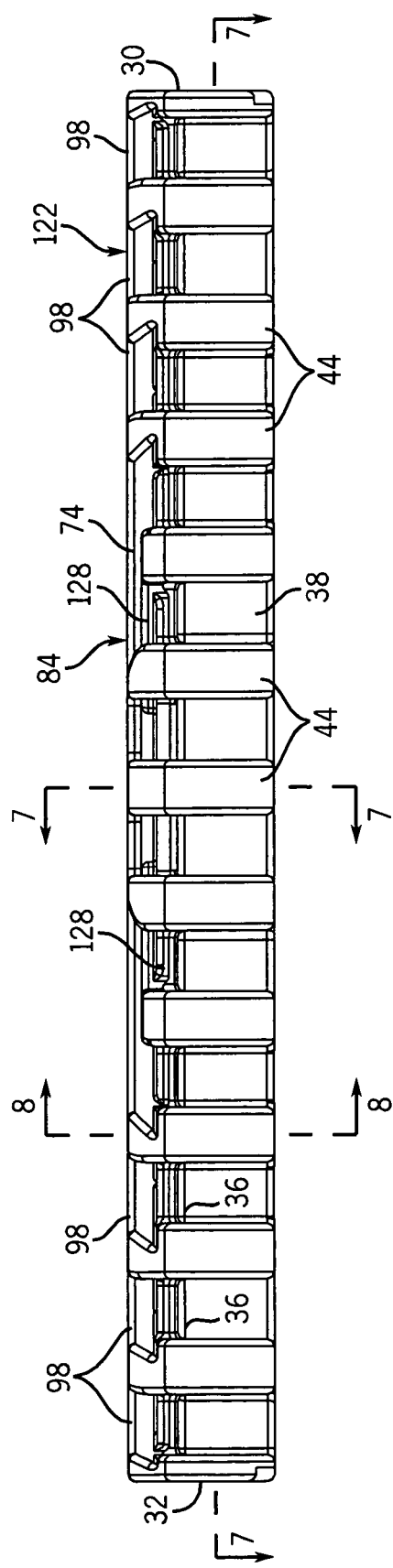
FIG. 5 is an outer side elevation view of the first module member of FIG. 2.
Figure 6:
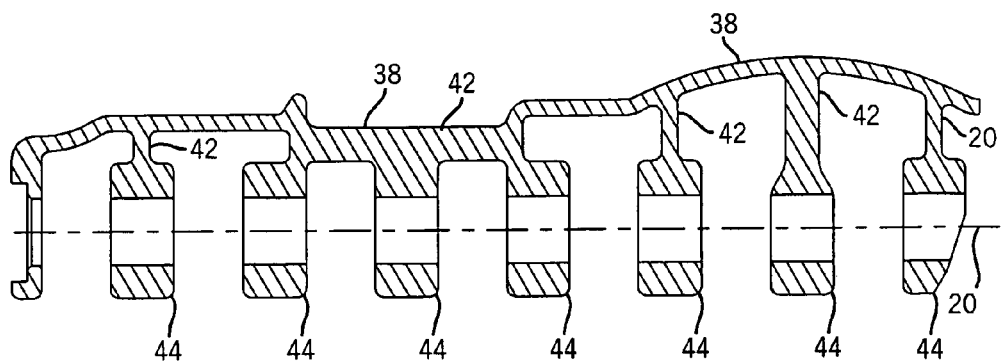
FIG. 6 is a sectional view along line 6-6 of FIG. 5.
Figure 7:
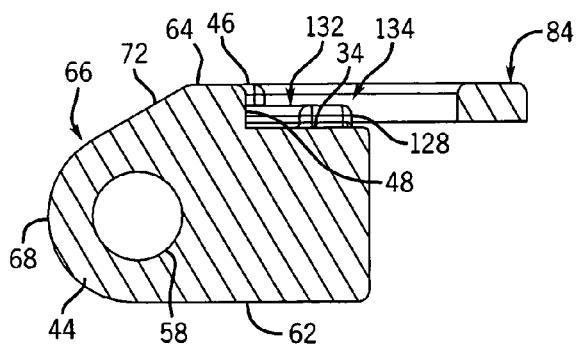
FIG. 7 is a sectional view along line 7-7 of FIG. 5.
Figure 8:
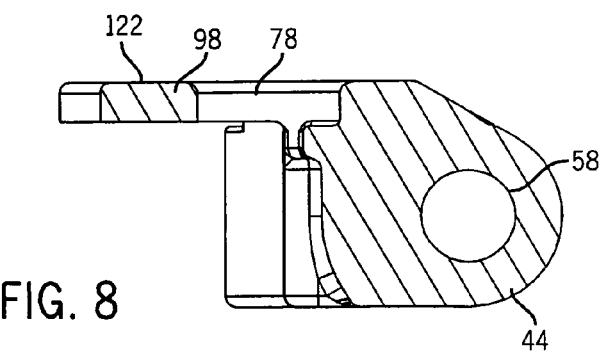
FIG. 8 is a sectional view along line 8-8 of FIG. 5.
Figure 9:
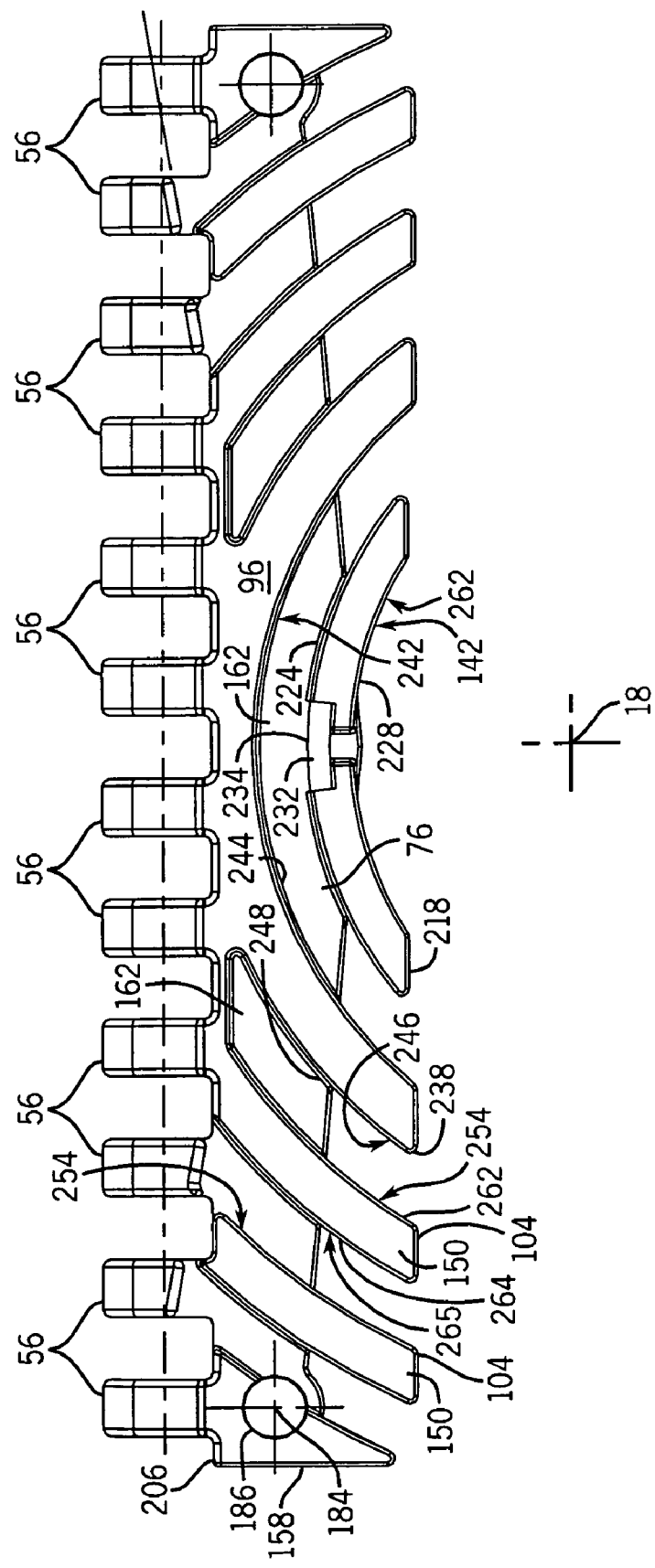
FIG. 9 is a top view of a second module member of the module of FIG. 2.
Figure 10:
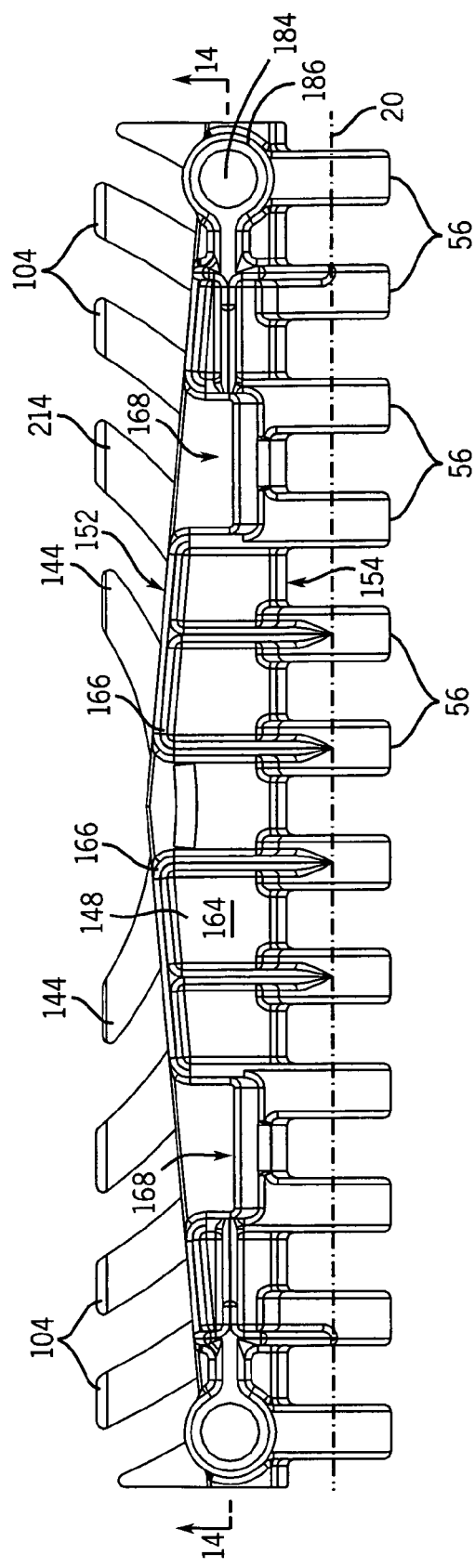
FIG. 10 is a bottom view of the second module member of the module of FIG. 2.
Figure 11:
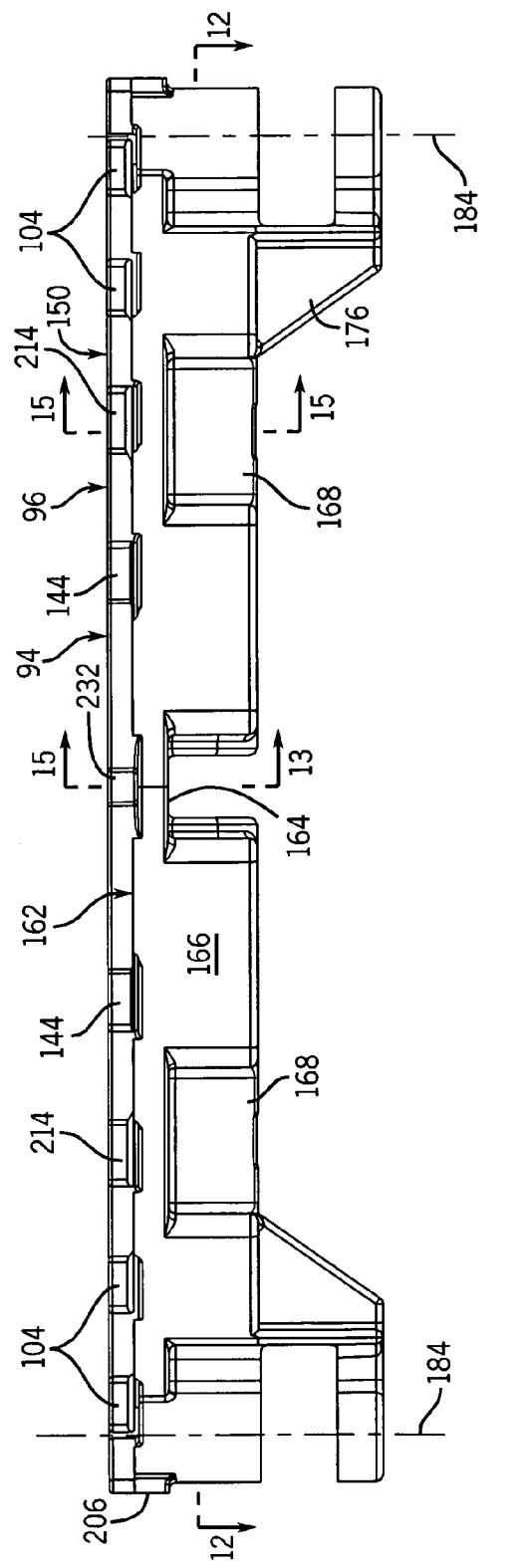
FIG. 11 is an inner side elevation view of the second module member of FIG. 2.
Figure 16:
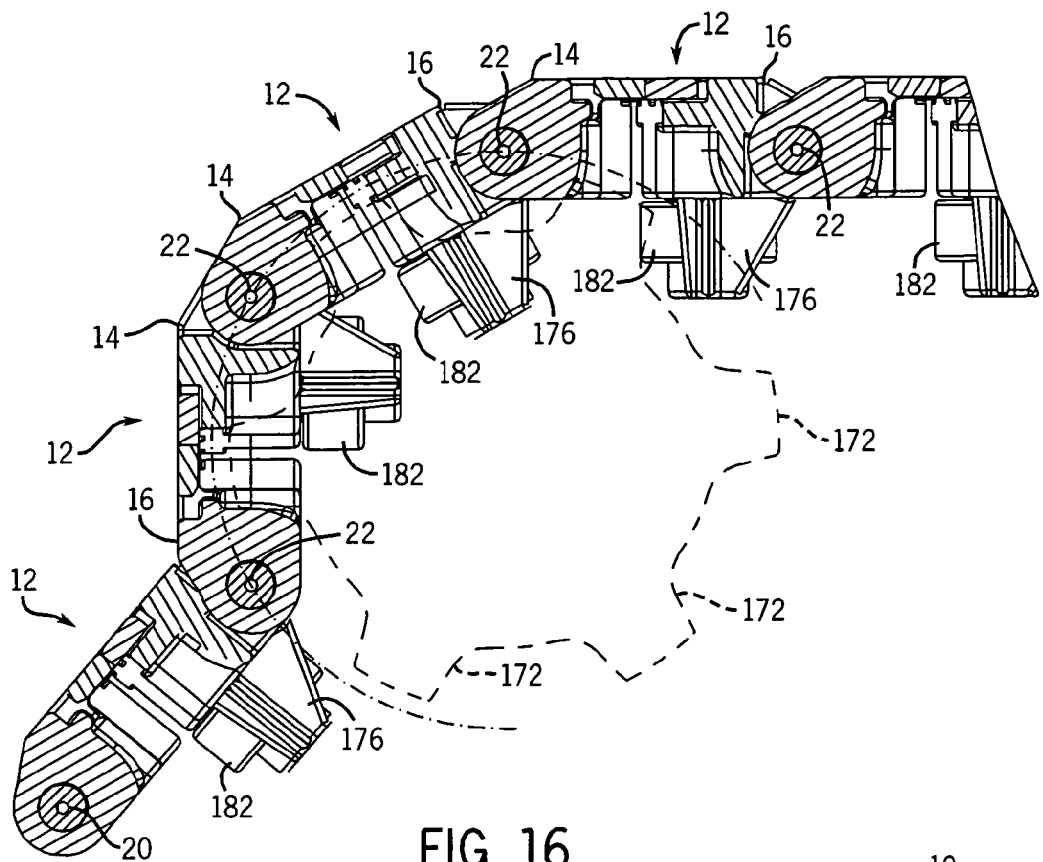
FIG. 16 is a sectional view along line 16-16 of FIG. 1.
Figure 17:
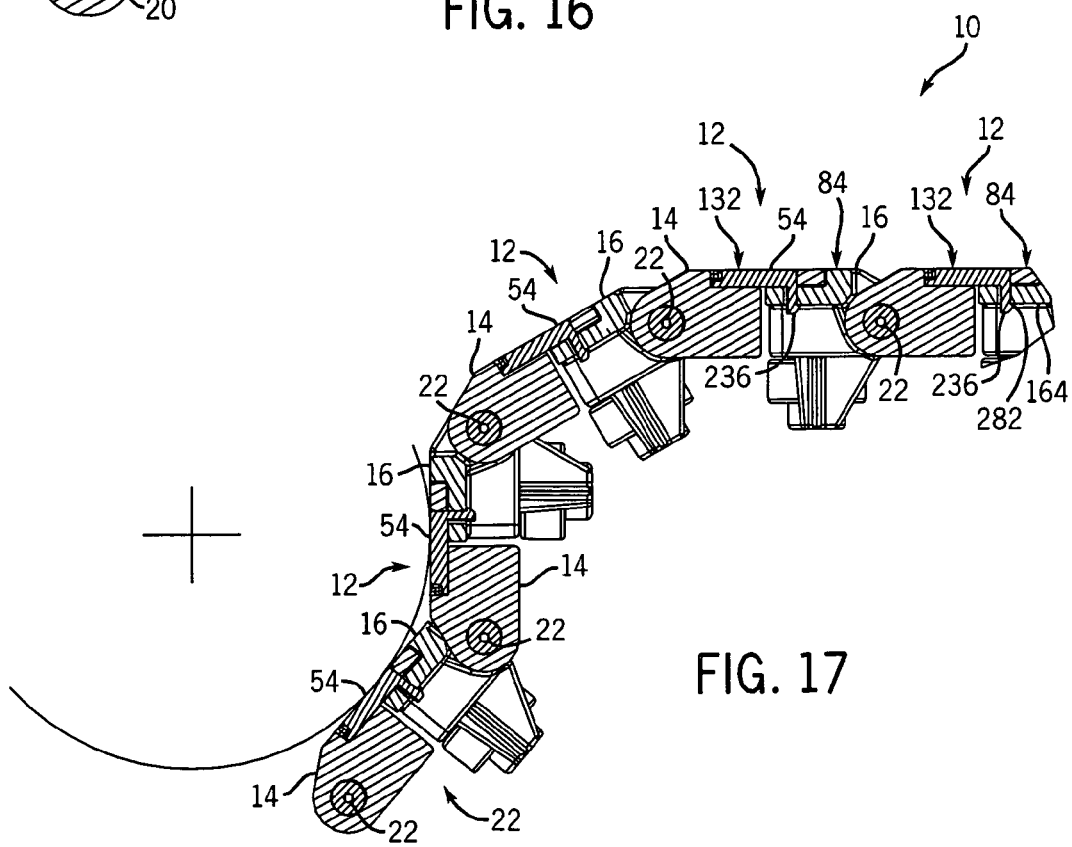
FIG. 17 is a sectional view along line 17-17 of FIG. 11.
Figure 18:
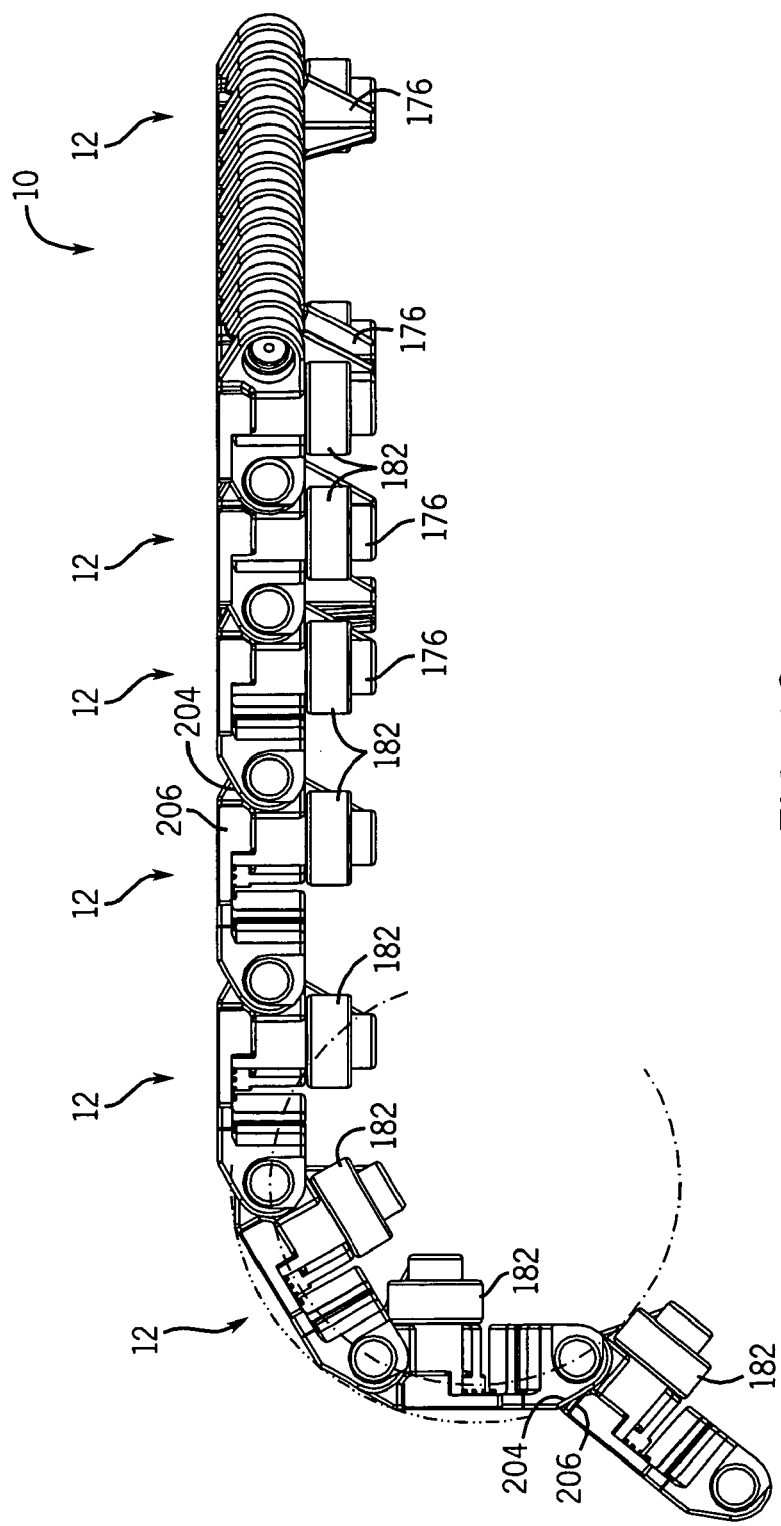
FIG. 18 is a end view of the chain of FIG. 1.
Figure 19:
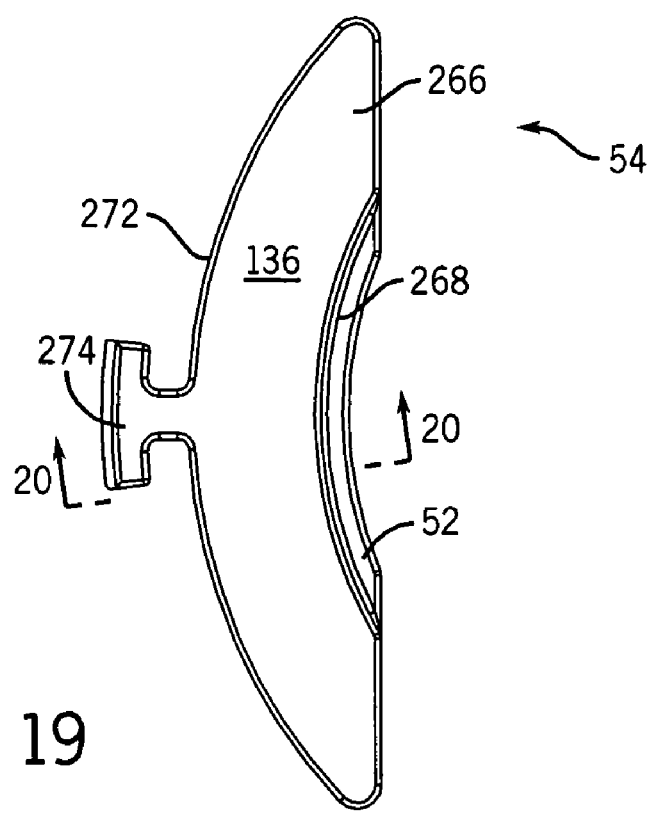
FIG. 19 is a top view of a locking cap of FIG. 1.
Figure 20:
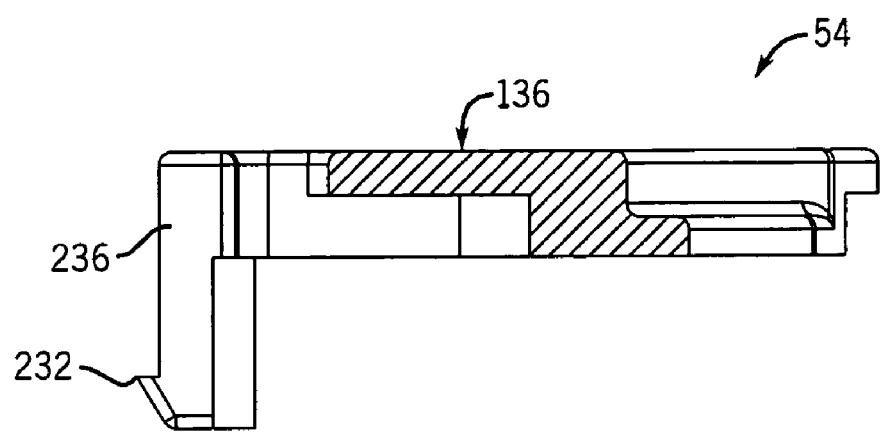
FIG. 20 is a sectional view along line 20-20 of FIG. 19.

A side-flexing modular chain 10 incorporating the present invention and shown in FIGS. 1-20 distributes chain tension across the width of the chain modules 12 as the chain 10 negotiates a curve. Each chain module 12 includes a first module member 14 pivotally linked to a second module member 16 about a module vertical axis 18. Each module 12 is pivotally joined to adjacent modules 12 about a horizontal axis 20 defined by a hinge pin 22. Although the term chain is used herein to describe the preferred embodiment, the present invention can also be a belt. Accordingly, when the term chain is used in this description, it is also understood to include a belt.

The first module member 14 shown in FIGS. 1-8 and 15-16 includes a body 24 having an inner side 26 and an outer side 28 joined by ends 30, 32 and a body top 34 and body bottom 36. A transverse rib 38 extends downwardly from the body bottom 36 and between the body ends 30, 32 to stiffen the first module member 14. Branch ribs 42 extending from the transverse rib 38 in the direction of conveyor travel join link ends 44 spaced between the body ends 30, 32 to the transverse rib 38. A locking cap shelf 46 extending inwardly over the body top 34 from the body outer side 28 defines a slot 48 for receiving a lip 52 extending from a locking cap 54 that vertically locks the first and second module members 14, 16 relative to each other.

The link ends 44 extend from the outer side 28 and interdigitate with link ends 56 extending from the second module member 16 of an adjacent module 12. Circular apertures 58 having a diameter only slightly larger than the diameter of the hinge pin 22 are coaxially formed through the link ends 44 in a direction transverse to the direction of conveyor travel, and receive the hinge pin 22 to pivotally link the adjacent modules 12 together. Although circular apertures 58 having a diameter only slightly larger than the diameter of the hinge pin 22 are preferred because of the advantages described below, slotted apertures can be used to provide a side flexing chain that can negotiate even tighter curves without departing from the scope of the invention.

Each first module member link end 44 has a bottom surface 62 and a top surface 64. The top surface 64 is spaced above the body top 34 and joined to the bottom surface 62 by a link end surface 66. The link end surface 66 has a rounded portion 68 extending from the bottom surface 62. The rounded portion 68 is joined to the link end top surface 64 by a straight angled portion 72. The straight angled portion 72 minimizes interference with the second module member 16 which allows the chain 10 to backflex.

A semi annular retaining rib 74 extending from the outer side 28 of the first module member body 24 across the body top 34 and past the inner side 26 is centrally located between the body ends 30, 32. The rib 74 is slidably received in a semi annular slot 76 formed in the second module member 16 to pivotally link the first and second module members 14, 16 together about the module vertical axis 18. Inner and outer sides 78, 82 of the rib 74 are joined by a top surface 84 and a bottom surface 86. Inner and outer cam surfaces 88, 92 defining the inner and outer sides 78, 82 of the retaining rib 74 slidably engage cam surfaces 222, 242 defining the semi annular slot 76 to transfer forces, such as chain tension, between the first and second modules 14, 16. The top surface 84 of the rib 74 defines the module top surface which supports a product being conveyed.

Arcuate cam fingers 98 extend from the body outer side 28 of the first module member body 24 across the body top 34 and past the first module member inner side 26 toward the second module member 16. A plurality of the fingers 98 are located between the retaining rib 74 and each end 30, 32 of the first module member 14 and define slots 102 above the body top 34. The slots 102 are spaced between the body ends 30, 32 and slidably receive cam fingers 104 extending from the second module member 16 interdigitating with the cam fingers 98 of the first module member 14. Preferably, the cam fingers 98, 104 are coaxial about the module vertical axis 18.

Each cam finger 98 includes inner and outer cam surfaces 106, 108 defining inner and outer sides 112, 114 of the finger 98. The cam surfaces 106, 108 slidably engage cam surfaces 254, 256 of the second module member fingers 104 to transfer forces between the first and second module members 14, 16. The inner and outer sides 112, 114 of each finger 98 are joined by a top surface 122 and a bottom surface 124. The top surface 122 of each finger 98 forms part of the module top surface which supports a product being conveyed.

A pair of curved retention fingers 128 coaxial with the module vertical axis 18 extend from the body outer side 28 of the first module member 14 across the body top 34 toward each other. Top surfaces 132 of the retention fingers 128 are spaced below the top surfaces 84, 122 of the retaining rib 74 and cam fingers 98 to form a recess 134 in the module top surface. The recess 134 receives the locking cap 54 having a top surface 136 substantially flush with the module top surface, and thus the top surface 84, 122 of the retaining rib 74 and cam fingers 98.

The retention fingers 128 define an arc coaxial with the retaining rib 74 and cam fingers 98 and are located radially inwardly from the retaining rib 74. Each retention finger 128 includes an inner cam surface 138 slidably engaging a cam surface 142 of an inner semi annular rib 144 forming part of the second module member 16 to transfer forces between the first and second module members 14, 16.

The second module member 16 shown in FIGS. 1, 2 and 9-18 includes a body 148 having an inner side 152 and an outer side 154 joined by ends 156, 158 to define a body top 162 and a body bottom 164. A pair of symmetrical transverse ribs 166 extending vertically downwardly from the body bottom 164 stiffen the body 148, and form engagement pockets 168. Each engagement pocket 168 engages a sprocket tooth 172 that propels the module 12 in the direction of conveyor travel. Branch ribs 174 extending from the transverse ribs 166 in the direction of conveyor travel join the transverse ribs 166 to link ends 56 spaced between the second module member ends 156, 158.

A roller shaft lower bracket 176 extending downwardly from the body bottom 164 proximal each body end 156, 158 defines a transversely opening roller slot 178 beneath the body bottom 164 for receiving a side roller 182. A vertical shaft aperture 186 formed through the body 148 and bracket 176 receives a vertical roller shaft 188 that defines a side roller vertical axis 184 and rotatably mounts a side roller 182 in the roller slot 178.

Each side roller 182 rotates about a side roller vertical axis 184 and extends past the adjacent body end 156, 158 to engage structure, such as a conveyor frame, as the chain module 12 moves along a conveyor path in the direction of conveyor travel. Of course, the side roller 182 can be mounted to the first module member 14, or be omitted, without departing from the scope of the invention.

The link ends 56 joined to the transverse ribs 166 extend from the body outer side 154 and interdigitate with link ends 44 extending from a first module member 14 of an adjacent module 12. Apertures 192 having a diameter only slightly larger than the diameter of the hinge pin 22 are coaxially formed through the link ends 56 in a direction transverse to the direction of conveyor travel, and receive the hinge pin 22 to pivotally link the adjacent modules 12 together. Although circular apertures 192 having a diameter only slightly larger than the diameter of the hinge pin 22 are preferred because of the advantages described below, slotted apertures can be used to provide a side flexing chain that can negotiate even tighter curves without departing from the scope of the invention.

Each link end 56 has a bottom surface 194 and a top surface 196. The top surface 196 is spaced above the body top 162 and joined to the bottom surface 194 by a link end surface 198. The link end surface 198 has a rounded portion 202 extending from the bottom surface 194. The rounded portion 202 is joined to the link end top surface 196 by a straight angled portion 204. The straight angled portion 204 minimizes interference with the first module member 14 which allows the chain 10 to backflex. A backflex stop 206 formed adjacent each body end 156, 158 engages the straight angled portion 72 of the outermost link ends 44 of the first module member 14 to limit the amount of backflex to a predetermined amount. Of course the backflex stops 206 can be eliminated to increase the amount of backflex allowed for the chain 10.

The semi annular slot 76 is defined above the body top 162 between a pair of inner and outer nested coaxial semi annular ribs 144, 214 that are coaxial with the module vertical axis 18. The inner and outer ribs 144, 214 are slidably received in the slots 102 defined by the first module member arcuate fingers 98 and retaining rib 74, and include top surfaces 94, 96 that are substantially flush with the top surfaces 84, 122 of the first module member retaining rib 74 and arcuate fingers 98 to define the module top surface for conveying product.

The inner rib 144 has outer ends 216, 218 that extend from the body inner side 152 toward the first module member 14 and includes an outer cam surface 222 formed on the radially outer side 224 of the inner rib 144. The outer cam surface 222 of the inner rib 144 engages the outer cam surface 92 formed on the semi annular rib 74 of the first module member 14 received in the slot 76. An inner cam surface 226 formed on the radially inner side 228 of the inner rib 144 engages the inner cam surfaces 138 of the first module member retention fingers 128. A snap fit opening 232 formed through the apex 234 of the inner rib 144 and body 148 receives a snap fit prong 236 extending downwardly from the locking cap 54.

The outer rib 214 is spaced radially outwardly from the inner rib 144 to define the semi annular slot 76. Outer ends 238 of the outer rib 214 extend from the body outer side 154, over the body top 162, and past the body inner side 152. The inner cam surface 242 formed on a radially inner side 244 of the outer rib 214 engages the inner cam surface 88 formed on the semi annular rib 74 of the first module member 14. Likewise, outer cam surfaces 246 formed on the radially outer side 248 of the outer rib 214 engage the inner cam surfaces 106 of the cam fingers 98 of the first module member adjacent to the outer rib 214.

Arcuate cam fingers 104 formed across the second module member body top 162 extend past the second module member body inner side 152 toward the first module member 14. The second module member cam fingers 104 interdigitate with the cam fingers 98 extending from the first module member 14. A pair of the second module member cam fingers 104 are spaced between the outer semi annular rib 214 and each end 156, 158 of the second module member body 148, and include top surfaces 150 that form part of the module top surface. Cam surfaces 254, 256 formed on each side 262, 264 of the second module member cam fingers 104 engage the cam surfaces 106, 108 formed on the first module member cam fingers 98 to transfer forces between the first and second module members 14, 16 of the chain module 12. The second module member cam fingers 104 are coaxial with the module vertical axis 18.

The locking cap 54 shown in FIGS. 1, 2, 17, 19 and 20 fits over the retention fingers 128 formed in the first module member 14, and is fixed vertically relative to first and second module members 14, 16 to prevent the module members 14, 16 from separating. The locking cap 54 includes a semi annular body 266 having an inner radius 268 and an outer radius 272. The lip 52 formed in the inner radius 268 slips into the slot 48 defined by the shelf 216 extending over the first module member body top 34 to vertically fix the inner radius 268 of the locking cap 54 relative to the first module member 14. A tab 274 extending radially outwardly from the apex 276 of the outer radius 272 includes a downwardly extending resilient snap fit prong 236 that is received in the snap fit opening 232 formed through the apex 234 of the inner rib 144 and body 148 of the second module member 16. A lip 282 formed proximal a distal end of the snap fit prong 236 engages the second module member body bottom 164 to vertically fix the outer radius 272 of the locking cap 54 relative to the second module member 16.

The module members 14, 16 pivot about the module vertical axis 18 to negotiate a curve while maintaining all of the link ends 44, 56 in tension to distribute the chain tension across the length of the hinge pin 22. Moreover, adjacent cam surfaces 88, 92, 106, 108, 138, 222, 226, 242, 246, 254, 256 of the retaining rib 74, interdigitating cam fingers 98, 104, inner and outer ribs 144, 214, and retention fingers 128 engage each other to transfer chain tension between the first and second module members 14, 16 across the width (i.e. between the module members 14, 16 ends 30, 32, 156, 158). As a result, the chain tension is distributed within the chain module 12 and between chain modules 12 across the entire width of the chain 10 to minimize failure.

Referring to FIGS. 1-20, the chain module 12 is assembled by slipping the semi annular retaining rib 74 of the first module member 14 into the semi annular slot 76 of the second module member 16 and interdigitating the cam fingers 98 of the first module member 14 with the cam fingers 104 of the second module member 16. The locking cap lip 52 is then slipped under the shelf 46 of the first module member 14 and the snap fit prong 236 is pressed into the snap fit opening 232 of the second module member 16 until the snap fit prong lip 282 engages the second module member bottom 164. Engaging the snap fit prong lip 282 with the second module member bottom 164, fixes the locking cap 54 over the retention fingers 128 of the first module member 14 and locks the first module member 14 relative to the second module member 16.

The assembled chain modules 12 are joined together to form a chain 10 by interdigitating the link ends 44 of the first module member 14 with the link ends 56 of a second module member 16 of an adjacent chain module 12, such that the apertures 58, 192 formed through the interdigitating link ends 44, 56 are aligned. The hinge pin 22 is then slipped through the aligned apertures 58, 192 to pivotally link the adjacent chain modules 12 about the hinge pin 22. Although a chain 10 formed from substantially identical modules 12 is disclosed, dissimilar modules including modules known in the prior art can be interspersed between the modules disclosed herein without departing from the scope of the invention.

In use, a plurality of the chain modules 12 are pivotally linked together by a plurality of hinge pins 22 to form an endless chain 10. The first and second chain module members 14, 16 of each chain module 12 pivot about the respective chain module vertical axis 18 to negotiate a curve in the conveyor path. Advantageously, the module members 14, 16 pivot about the module vertical axis 18 to negotiate the curve while maintaining all of the link ends 44, 56 in tension to distribute the chain tension across the length of the hinge pin 22.

In the embodiment described above, the module vertical axis 18 does not extend through the module 12 to allow the module 12 to negotiate very tight curves in the conveyor path. However, a module 312, such as described below, in which the module vertical axis 318 extends through the module 312 can be provided without departing from the scope of the invention.

Figure 21:
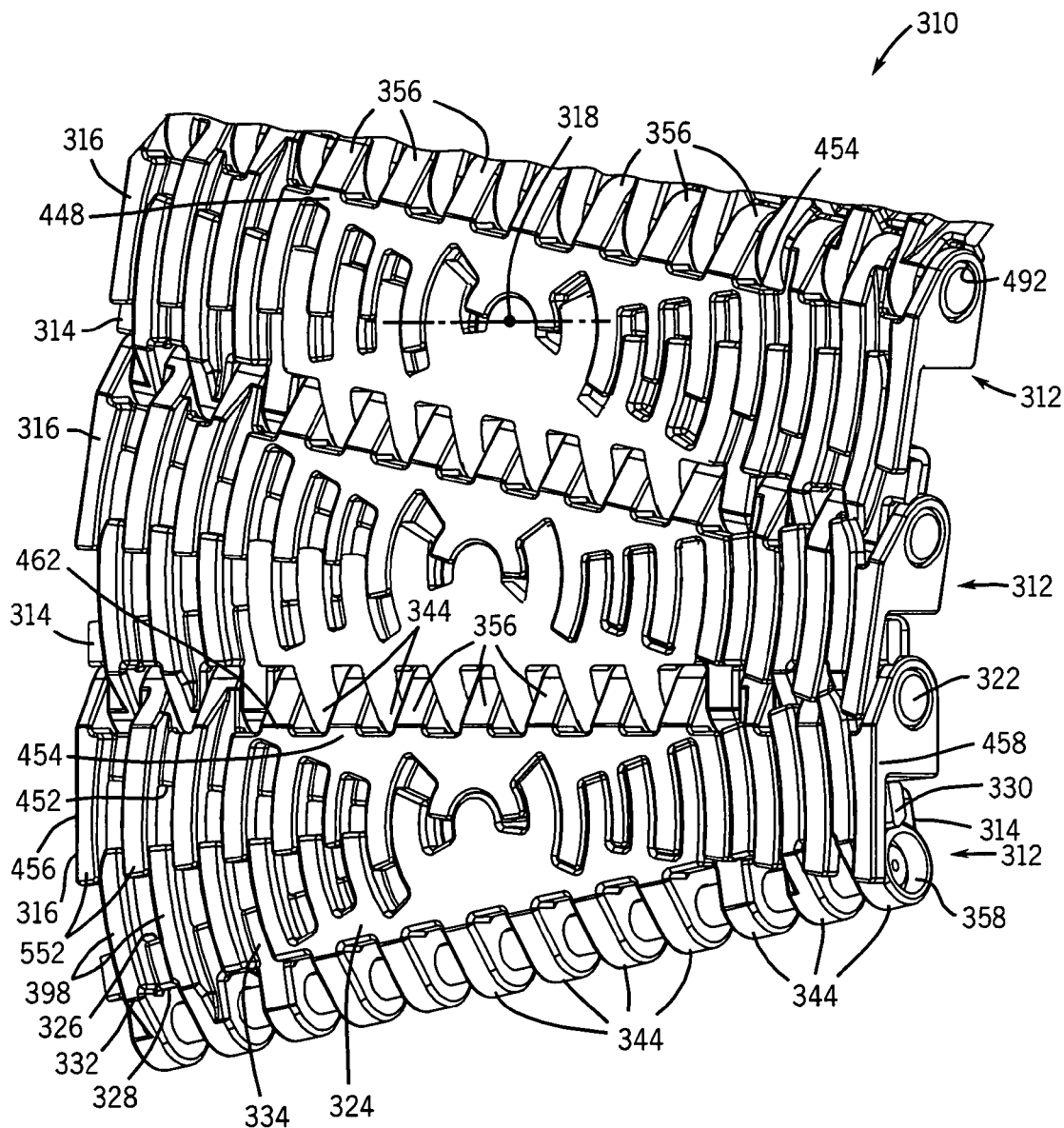
FIG. 21 is a top perspective view of an alternative modular chain incorporating the present invention.
Figure 22:
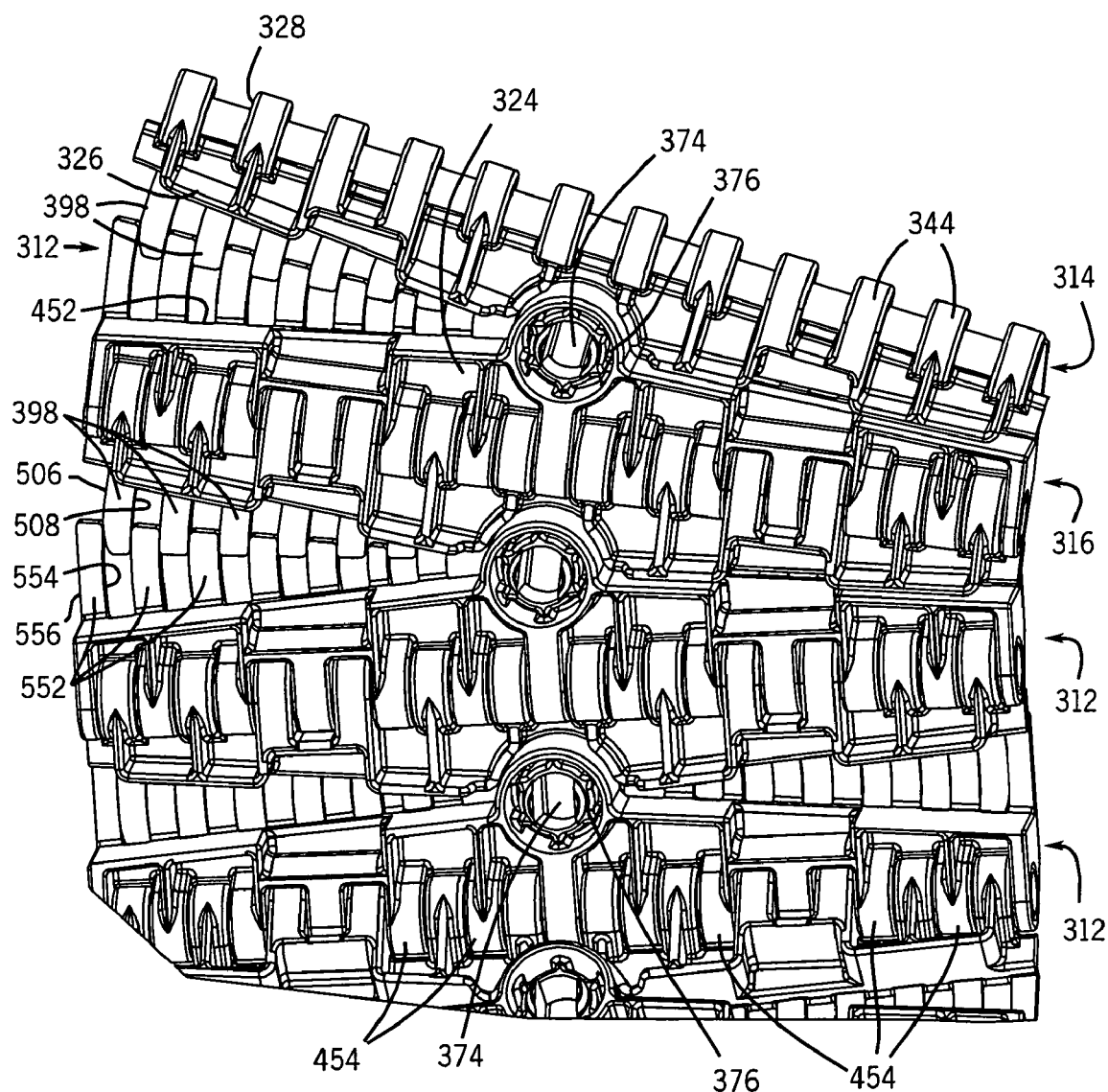
FIG. 22 is a bottom perspective view of the chain of FIG. 21.

In a second embodiment shown in FIGS. 21 and 22, a chain module 312 incorporating the present invention includes first and second module members 314, 316 pivotally coupled together about a module vertical axis 318 defined by a vertical post 374. The first module member 314 includes a body 324 having an inner side 326 and an outer side 328 joined by ends 330, 332 to define a body top 334. Link ends 344 extend from the outer side 328 and interdigitate with link ends 356 extending from a second module member 316 of an adjacent module 312. Apertures 358 having a diameter only slightly larger than the diameter of the hinge pin 322 are coaxially formed through the link ends 344 and receive the hinge pin 322 to pivotally link the adjacent modules 312 together.

A vertical post 374 extending from the body 324 proximal the inner side 326 of the first module member 314 is received in a coupling aperture 376 coaxial with the module vertical axis 318. The vertical post 374 received in the aperture 376 pivotally couples the first and second module members 314, 316 together about the module vertical axis 318. A lip (not shown) proximal a distal end of the post 374 can be provided that engages the second module member 316 and axially locks the first module member 314 relative to the second module member 316.

Arcuate cam fingers 398 formed across the body top 334 extend past the first module member inner side 326 toward the second module member 316. Cam surfaces 506, 508 formed on the sides of the fingers 398 engage cam surfaces 554, 556 formed on arcuate cam fingers 552 extending from the second module member 316 to transfer chain tension between the first and second module members 314, 316 of the chain module 312.

The second module member 316 includes a body 448 having an inner side 452 and an outer side 454 joined by ends 456, 458 to define a body top 462. Link ends 356 extend from the body outer side 454 and interdigitate with link ends 344 extending from a first module member 314 of an adjacent module 312. Apertures 492 having a diameter only slightly larger than the diameter of the hinge pin 322 are coaxially formed through the link ends 356, and receive the hinge pin 322 to pivotally link the adjacent modules 312 together.

The coupling aperture 376 is formed proximal the inner side 326 of the second module member 316, and is coaxial with the module vertical axis 318. The vertical post 374 extending from the first module member body 324 is axially received in the coupling aperture to pivotally couple the first and second module members 314, 316 together about the module vertical axis 318.

Arcuate cam fingers 552 formed across the second module member body top 462 extend past the second module member body inner side 452 toward the first module member 314 and interdigitate with the arcuate cam fingers 398 extending from the first module member 314. Cam surfaces 506, 508, 554, 556 formed on the sides of the fingers 398, 552 engage each other to transfer chain tension between the first and second module members 314, 316 of the chain module 312.

As in the first embodiment, the module members 314, 316 pivot about the module vertical axis 318 to negotiate a curve while maintaining all of the link ends 344, 356, in tension to distribute the chain tension across the length of the hinge pin 322. Moreover, the adjacent cam surfaces 506, 508, 554, 556 of the interdigitating fingers 398, 552 engage each other to transfer chain tension between the first and second module members 314, 316. As a result, the chain tension is distributed within the chain module 312 and between chain modules 312 across the entire width of the chain 310 to minimize failure.

While there have been shown and described what is at present considered the preferred embodiments of the invention, it will be obvious to those skilled in the art that various changes and modifications can be made therein without departing from the scope of the invention defined by the appended claims.

We claim:

1. A side-flexing conveyor chain module comprising:
   a first module member having first link ends extending in a direction of conveyor travel and first fingers extending in a direction substantially opposite to the direction of conveyor travel, said first fingers having first cam surfaces; and
   a second module member pivotally coupled to said first module member about a module vertical axis, said second module member having second link ends extending in a direction substantially opposite to the direction of conveyor travel and second fingers extending substantially in the direction of conveyor travel and interdigitating with said first fingers, said second fingers having second cam surfaces engaging said first cam surfaces to transfer forces between said first and second module members.

2. The conveyor chain module as in claim 1, in which said first module member is coupled to said second module member by a retaining rib extending from one of said first and second module members which slidably engages the other of said first and second module members.

3. A side-flexing conveyor chain module comprising:
   a first module member having first link ends extending in a direction of conveyor travel and first fingers extending in a direction substantially opposite to the direction of conveyor travel;
   a second module member pivotally coupled to said first module member about a module vertical axis, said second module member having second link ends extending in a direction substantially opposite to the direction of conveyor travel and second fingers extending substantially in the direction of conveyor travel and interdigitating with said first fingers; and
   a locking cap engaging both of said first and second module members to fix said first and second module members relative to each other.

4. The conveyor chain module as in claim 3, in which said locking cap includes a snap fit prong that engages one of said first and second module members to fix said locking cap relative to said one of said first and second module members.

5. The conveyor chain module as in claim 3, in which one of said first and second module members includes a body and a shelf spaced above said body, and said locking cap is received between said shelf and said body to fix said locking cap relative to said one of said first and second module members.

6. The conveyor chain module as in claim 3, in which said locking cap is fixed over at least one retaining finger forming part of one of said first and second module members to fix said first module member relative to said second module member.

7. The conveyor chain module as in claim 1, in which said first link ends include apertures for receiving a hinge pin in a direction transverse to the direction of conveyor travel.

8. The conveyor chain module as in claim 1, in which said module vertical axis does not extend through said module.

9. The conveyor chain module as in claim 1, in which a side roller mounted adjacent an end of one of said first and second module members is rotatable about a side roller vertical axis.

10. A side-flexing conveyor chain module comprising:
    a first module member having first link ends extending in a direction of conveyor travel and first fingers extending in a direction substantially opposite to the direction of conveyor travel; and
    a second module member pivotally coupled to said first module member about a module vertical axis, said second module member having second link ends extending in a direction substantially opposite to the direction of conveyor travel and second fingers extending substantially in the direction of conveyor travel and interdigitating with said first fingers, in which said first module member is coupled to said second module member by a vertical post extending from one of said first and second module members and received in an aperture formed in the other of said first and second module members.

11. A side-flexing conveyor chain comprising:
a first chain module including a first module member pivotally coupled to a second chain module about a module vertical axis, said first module member having first link ends extending in a direction of conveyor travel and first fingers extending in a direction substantially opposite to the direction of conveyor travel, said first fingers having first cam surfaces, and said second module member having second link ends extending in a direction substantially opposite to the direction of conveyor travel and second fingers extending substantially in the direction of conveyor travel and interdigitating with said first fingers, said second link ends including apertures for receiving a hinge pin in a direction transverse to the direction of conveyor travel, and said second fingers having second cam surfaces engaging said first cam surfaces to transfer forces between said first and second module members;
a second chain module including a first link ends extending in a direction of conveyor travel and interdigitating with said second link ends of said second chain module member of said first chain module, said first link ends including apertures aligned with said apertures formed through said second link ends of said first module second module member for receiving a hinge pin in a direction transverse to the direction of conveyor travel; and
a hinge pin received through said aligned apertures to pivotally link said first and second modules about said hinge pin.

12. The conveyor chain as in claim 11, in which said first module member is coupled to said second module member by a retaining rib extending from one of said first and second module members which slidably engages the other of said first and second module members.

13. The conveyor chain as in claim 11, in which a locking cap engages both of said first and second module members to fix said first and second module members relative to each other.

14. The conveyor chain as in claim 13, in which said locking cap includes a snap fit prong that engages one of said first and second module members to fix said locking cap relative to said one of said first and second module members.

15. The conveyor chain as in claim 13, in which one of said first and second module members includes a body and a shelf spaced above said body, and said locking cap is received between said shelf and said body to fix said locking cap relative to said one of said first and second module members.

16. The conveyor chain as in claim 13, in which said locking cap is fixed over at least one retaining finger forming part of one of said first and second module members to fix said first module member relative to said second module member.

17. The conveyor chain as in claim 11, in which said module vertical axis does not extend through said module.

18. The conveyor chain as in claim 11, in which a side roller mounted adjacent an end of one of said first and second module members is rotatable about a side roller vertical axis.

19. The conveyor chain module as in claim 11, in which said first module member is coupled to said second module member by a vertical post extending from one of said first and second module members and received in an aperture formed in the other of said first and second module members.

20. The conveyor chain as in claim 11, in which said apertures are circular.

* * * * *

UNITED STATES PATENT AND TRADEMARK OFFICE
CERTIFICATE OF CORRECTION

PATENT NO. : 7,293,644 B2  Page 1 of 1
APPLICATION NO. : 11/005250
DATED : November 13, 2007
INVENTOR(S) : Stebnicki et al.

It is certified that error appears in the above-identified patent and that said Letters Patent is hereby corrected as shown below:

Column 3, line 13 the first and second instance of "a link end surface 66" should be changed to -- a link end end surface 66 --

Column 4, lines 49-50 the first and second instance of "link end surface 198" should be changed to -- link end end surface 198 --

Signed and Sealed this

Thirteenth Day of May, 2008

JON W. DUDAS
*Director of the United States Patent and Trademark Office*